United States Patent [19]

Kanoh et al.

[11] Patent Number: 4,643,576
[45] Date of Patent: Feb. 17, 1987

[54] FRINGE SCANNING SHEARING INTERFEROMETER

[75] Inventors: Toshio Kanoh, Tokyo; Taira Kouchiwa, Kanagawa, both of Japan

[73] Assignee: Ricoh Company Ltd., Tokyo, Japan

[21] Appl. No.: 724,397

[22] Filed: Apr. 18, 1985

[30] Foreign Application Priority Data

Apr. 19, 1984 [JP] Japan ................................. 59-79173
Apr. 19, 1984 [JP] Japan ................................. 59-79174

[51] Int. Cl.$^4$ ......................... G01B 9/02; G01B 11/00
[52] U.S. Cl. ..................................... 356/353; 356/359
[58] Field of Search ........................ 356/353, 359, 360

[56] References Cited

U.S. PATENT DOCUMENTS

| | | | |
|---|---|---|---|
| 3,676,006 | 7/1972 | Velzel | 356/359 |
| 3,767,307 | 10/1973 | Bowker | 356/360 X |
| 4,171,159 | 10/1979 | White | 356/360 X |
| 4,575,248 | 3/1986 | Horwitz et al. | 356/353 |

Primary Examiner—Eugene R. LaRoche
Assistant Examiner—David Mis
Attorney, Agent, or Firm—Cooper, Dunham, Griffin & Moran

[57] ABSTRACT

A fringe scanning shearing interferometer includes a converter lens for converting a wavefront reflected by an object under test illuminated with light into an approximately parallel wavefront, a beam splitter for dividing the approximately parallel wavefront into first and second wavefronts travelling in two directions, a pair of first and second prisms disposed respectively adjacent to the beam splitter in equally spaced relation thereto, a displacement mechanism for displacing the first prism in a direction normal to the direction in which the first wavefront falls on the first prism, a shearing device for slightly displacing the second prism in the same direction as that in which the second wavefront falls on the second prism, a photodetector, and a focusing lens for focusing the first and second wavefronts having passed respectively through the first and second prism, on the photodetector to produce interference fringes thereon.

18 Claims, 5 Drawing Figures

FRINGE SCANNING SHEARING INTERFEROMETER

BACKGROUND OF THE INVENTION

The present invention relates to a fringe scanning shearing interferometer, and more particularly to a fringe scanning shearing interferometer capable of measuring flat, spherical, and aspherical surfaces with high accuracy, and measuring the wavefront aberration, the degree of eccentricity, and the focal length, for example, of an optical device.

Conventional fringe scanning shearing interferometers operate to measure the surface configuration of an object under test in the following manner:

The laser beam emitted from a laser beam source is converted by a collimator lens into a parallel beam. The parallel beam is then passed successively through a first beam splitter, a second beam splitter, and a convex lens to illuminate the object. The light beam reflected by the object travels back through the convex lens to the second beam splitter, which divides the beam into two beams in different directions. One of the split beams goes through the first beam splitter to a third beam splitter, from which the beam travels through a focusing lens and falls on a photodetector. This split beam is referred to as a wavefront under test.

The other split beam is reflected by a vibrating mirror fixed to a piezoelectric device or a magnetostrictive device which serves as a device for varying the length of an optical path. The reflected beam is directed toward the third beam splitter and then goes through the focusing lens to the photodetector. This split beam is referred to as a reference wavefront.

Therefore, interference fringes are formed on the photodetector by the wavefront under test and the reference wavefront. The surface configuration of the object under test can now be identified by measuring the differences between phases at points on the interference fringes and computing the wavefront under test based on the measured phase differences.

The prior interferometers have been disadvantageous in that since the wavefronts of the split beams are required to travel over long distances through many different optical elements, the wavefronts are subjected to vibrations or other disturbances of external origin, and hence the measuring accuracy remains low.

SUMMARY OF THE INVENTION

It is an object of the present invention to provide a fringe scanning shearing interferometer which is highly resistant to vibrations for an increased measuring accuracy.

Another object of the present invention is to provide a fringe scanning shearing interferometer having a compact structure for laterally shearing a wavefront variably in two orthogonal directions in a plane normal to the direction of travel of the light beam.

According to the present invention, there is provided a fringe scanning shearing interferometer having many optical devices that are shared by the wavefront under test and the reference wavefront. The fringe scanning shearing interferometer includes two prisms disposed adjacent to a beam splitter to share many optical devices. The fringe scanning shearing interferometer is highly vibration-resistant and also is of a small size. Where each of the prisms comprises a corner-cube prism, switching between lateral shearing displacements in the two orthogonal directions, i.e., x- and y-directions, can easily be effected through a compact arrangement.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
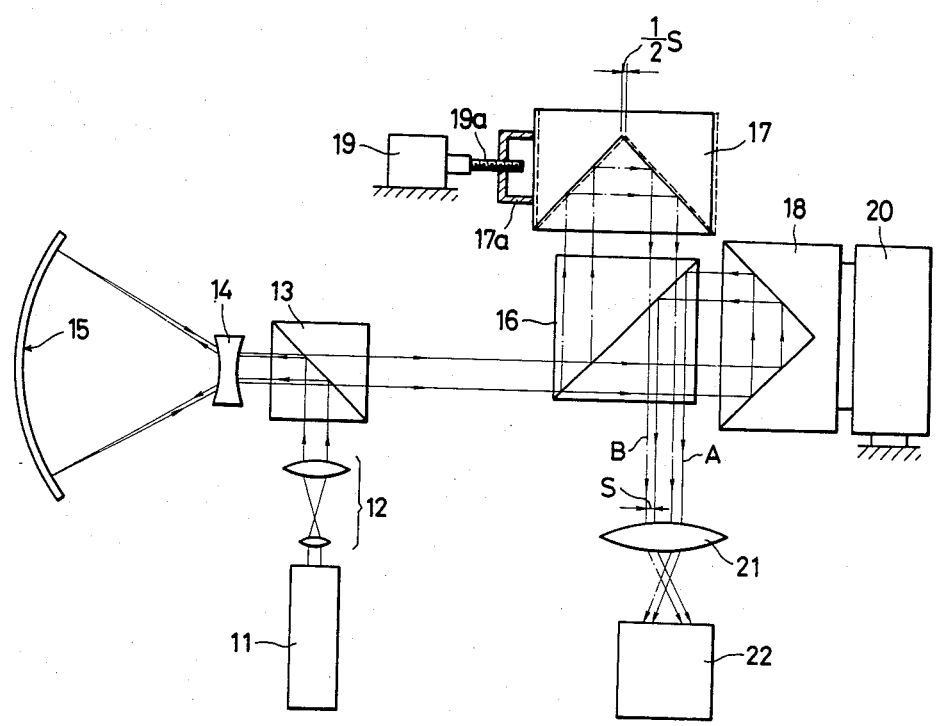
FIG. 1 is a schematic view of a fringe scanning shearing interferometer according to an embodiment of the present invention.

As shown in FIG. 1, a fringe scanning shearing interferometer according to an embodiment of the present invention includes a laser beam source 11, a collimator lens system 12, a beam splitter 13 for directing a laser beam from the laser beam source 11 toward an object under test, e.g., a curved surface 15 such as a concave surface, and a converter lens 14 for converting a wavefront reflected from the concave surface 15 under test into an approximately parallel wavefront. The surface under test may be a flat surface, a spherical surface, or an aspherical surface. The fringe scanning shearing interferometer also includes a beam splitter 16 for splitting the wavefront from the beam splitter 13 into wavefronts in two different directions. Each of the beam splitters 13, 16 has a mirror surface inclined at 45° with respect to the direction in which the light travels.

Two right-angled prisms 17, 18 are disposed adjacent to the beam splitter 16 in equally spaced relation thereto and each have two roof surfaces for reflecting back a light beam from the beam splitter 16. The right-angled prism 17 is coupled to a displacement means for displacing the prism 17 in a direction normal to the direction in which light falls on the prism 17. The displacement means comprises a step motor 19, a screw shaft 19a coaxially connected to the shaft of the step motor 19, and a frame 17a threaded over the screw shaft 19a and fixed to the right-angled prism 17. However, the displacement means may comprise a piezoelectric device, for example, rather than the illustrated arrangement.

The right-angled prism 18 is coupled with a shearing means for slightly displacing the prism 18 in the same direction as that in which light falls on the prism 18. The shearing means comprises a piezoelectric device 20, for example, connected to the prism 18. However, the shearing means may comprise a step motor, a screw shaft, and a frame arranged in the same manner as the displacement means for displacing the prism 17.

The wavefronts which have been reflected from the right-angled prisms 17, 18 and passed through the beam splitter 16 are focused by a focusing lens 21 on a photodetector 22 to produce interference fringes thereon.

The fringe scanning shearing interferometer of the aforesaid construction will operate for measuring the concave surface 15 as follows:

The laser beam emitted from the laser beam source 11 is converted by the collimator lens system 12 into a parallel laser beam which is directed to the left (as seen in FIG. 1) by the beam splitter 13. The laser beam from the beam splitter 13 is then converted by the converter lens 14 into a reference spherical wave which then falls on the concave surface 15 under test.

The reference spherical wave lies on a reference spherical surface having a radius R extending from the focal point of the converter lens 14 to the vertex of the concave surface 15 on the optical axis thereof. If the concave surface 15 deviates at any optional point thereon from the reference spherical surface by d/2, then the wavefront reflected by the concave surface 15 has a wavefront aberration of d. The configuration of the concave surface 15 under test can be known by measuring d.

The light reflected from the concave surface 15 is light (hereinafter referred to as a "wavefront") containing information on the surface configuration of the concave surface 15. This wavefront then passes through the converter lens 14 and the beam splitter 13 toward the beam splitter 16. The wavefront slightly deviates from a plane wave by an amount which is exactly twice the deviation between the concave surface 15 and the reference spherical surface.

The wavefront is divided by the beam splitter 16 into two wavefronts which travel in two directions. One of the wavefronts goes along a straight path through the beam splitter 16, is reflected twice by the right-angled prism 18, and then reflected once by the beam splitter 16 to reach the focusing lens 21. This wavefront will be referred to as a wavefront A.

The other wavefront is reflected by the beam splitter 16, falls on the right-angled prism 17, is reflected twice thereby, goes along a straight path through the beam splitter 16 toward the focusing lens 21. This wavefront will be referred to as a wavefront B.

The wavefront B is laterally shifted a distance S by energizing the step motor 19 to move the right-angled prism 17 a distance (½)×S from the solid-line position of FIG. 1. On the photodetector 22, therefore, interference fringes are produced which result from interference between the wavefront A and the wavefront B which corresponds to a wavefront that would be produced by shifting the wavefront A by S. In this sense, this interference process is a shearing interference process.

The right-angled prism 18 can also be slightly displaced by the piezoelectric device 20 to modulate the phase of the wavefront A. In this sence, this interference process is a fringe scanning process.

Accordingly, the interference optical system of the aforesaid embodiment constitutes a fringe scanning shearing interferometer.

The fringe scanning shearing interferometer of the foregoing embodiment has many common optical elements shared by the two wavefronts A, B so that the interferometer is highly resistant to vibrations. However, since the right-angled prism 17 is sheared by the step motor 19 in one direction only, the measurement may not be effected sufficiently. If the right-angled prism 17 were to be shared in two orthogonal directions, then the prism 17 would have to be turned through 90° from the illustrated position. The mechanism required for turning the prism 17 would be large in size and hence so would the interferometer.

Figure 2:
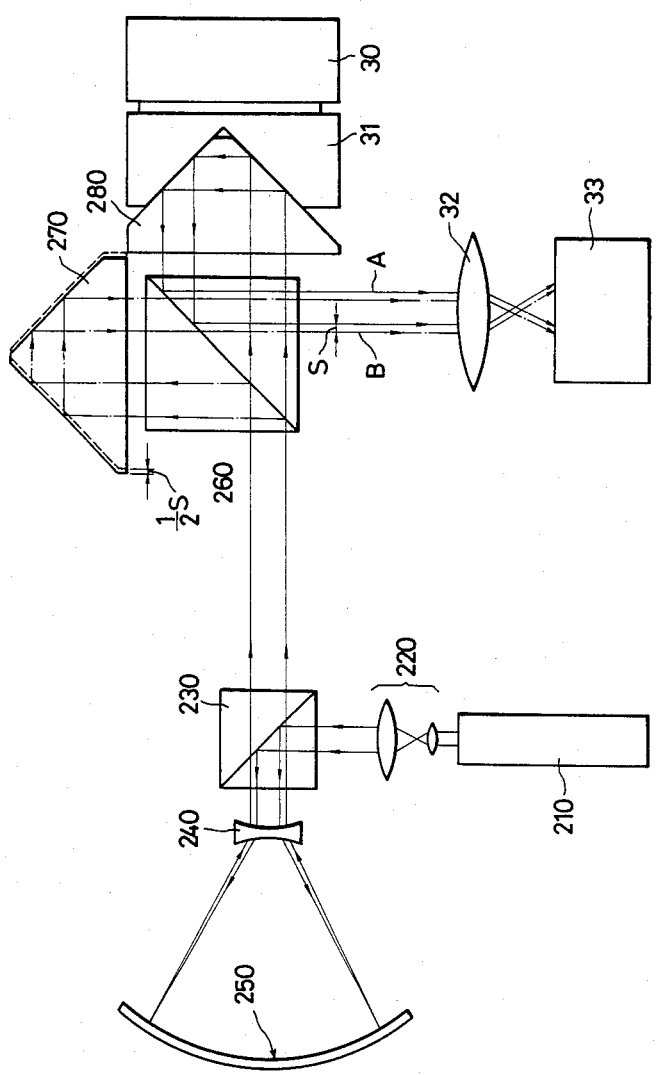
FIG. 2 is a schematic view of a fringe scanning shearing interferometer according to another embodiment of the present invention.

FIG. 2 shows a fringe scanning shearing interferometer according to another embodiment, which is designed to allow a prism to be sheared in two orthogonal directions, but which remains small in size. The fringe scanning shearing interferometer shown in FIG. 2 employs corner-cube prisms in place of right-angled prisms.

More specifically, as illustrated in FIG. 2, the fringe scanning shearing interferometer includes a laser beam source 210, a collimator lens system 220, a beam splitter 230 for directing a laser beam from the laser beam source 210 toward an object under test, i.e., a curved surface 250 such as a concave surface, and a converter lens 240 for converting a wavefront reflected from the concave surface 250 under test into an approximately parallel wavefront. The fringe scanning shearing interferometer also has a beam splitter 260 for splitting the wavefront from the beam splitter 230 into wavefronts in two different directions.

Figure 3:
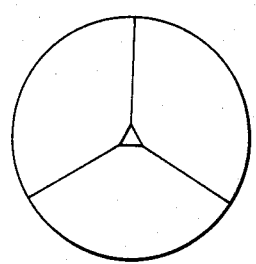
FIG. 3 is a plan view of a corner-cube prism.
Figure 4:
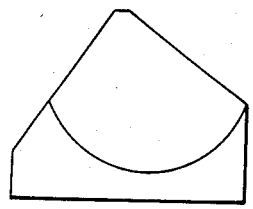
FIG. 4 is a front elevational view of the corner-cube prism shown in FIG. 3.

Two corner-cube prisms 270, 280 are disposed adjacent to the beam splitter 260 in equally spaced relation thereto. Each of the corner-cube prisms 270, 280 is shaped in plan as shown in FIG. 3 and in front elevation as shown in FIG. 4. Each corner-cube prism comprises a conical trihedral roof prism having three roof angles for reflecting a light beam back along an axis precisely parallel to the incident light beam.

Figure 5:
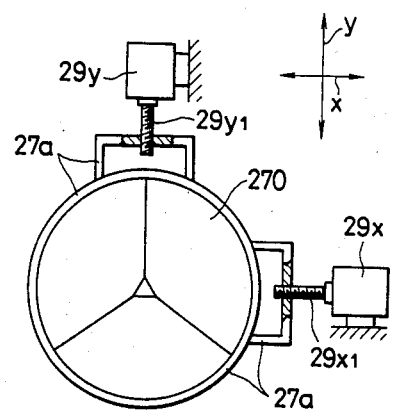
FIG. 5 is a plan view of the corner-cube prism and mechanisms for displacing the corner-cube prism.

The corner-cube prism 270 is coupled to a displacement means for displacing the prism 270 in two orthogonal directions in a plane normal to the direction in which light falls on the prism 270. As shown in FIG. 5, the displacement means comprises a step motor 29y, a screw shaft 29y1 coaxially connected to the shaft of the step motor 29y, and a frame 27a threaded over the screw shaft 29y1 and fixed to the corner-cube prism 270, for displacing the prism 270 in a y-direction. The displacement means also comprises a step motor 29x, a screw shaft 29x1 coaxially connected to the shaft of the step motor 29x and extending at a right angle with respect to the screw shaft 29y1, and a frame 27a threaded over the screw shaft 29x1 and fixed to the corner-cube prism 270, for displacing the prism 270 in an x-direction. However, the displacement means may comprise piezoelectric devices rather than the illustrated arrangements.

The corner-cube prism 280 is coupled with a shearing means for slightly displacing the prism 280 in the same direction as that in which light falls on the prism 280. The shearing means comprises a piezoelectric device 30, for example, connected to the prism 280 by a holder 31.

The wavefronts which have been reflected from the corner-cube prisms 270, 280 and passed through the beam splitter 260 are focused by a focusing lens 32 on a photodetector 33 to produce interference fringes thereon.

The fringe scanning shearing interferometer of FIGS. 2 through 5 will operate for measuring the concave surface 250 as follows:

The laser beam emitted from the laser beam source 210 is converted by the collimator lens system 220 into a parallel laser beam which is directed to the left (as seen in FIG. 2) by the beam splitter 230. The laser beam from the beam splitter 230 is then converted by the converter lens 240 into a reference spherical wave which then falls on the concave surface 250 under test.

The reference spherical wave lies on a reference spherical surface having a radius R extending from the focal point of the converter lens 240 to the vertex of the concave surface 250 on the optical axis thereof. If the concave surface 250 deviates at any optional point thereon from the reference spherical surface by d/2, then the wavefront reflected by the concave surface 250 has a wavefront aberration of d. The configuration of the concave surface 250 under test can be known by measuring d.

The light reflected from the concave surface 250 is light (hereinafter referred to as a "wavefront") containing information on the surface configuration of the concave surface 250. This wavefront then passes through the converter lens 240 and the beam splitter 230 toward the beam splitter 260. The wavefront slightly deviates from a plane wave by an amount which is exactly twice the deviation between the concave surface 250 and the reference spherical surface.

The wavefront is divided by the beam splitter 260 into two wavefronts which travel in two directions. One of the wavefronts goes along a straight path through the beam splitter 260, is reflected three times by the corner-cube prism 280, and then reflected once by the beam splitter 260 to reach the focusing lens 32. This wavefront will be referred to as a wavefront A.

The other wavefront is reflected by the beam splitter 260, falls on the corner-cube prism 270, is reflected three times thereby, goes along a straight path through the beam splitter 260 toward the focusing lens 32. This wavefront will be referred to as a wavefront B.

The wavefront B is laterally shifted a distance S by energizing the step motor 29x to move the corner-cube prism 270 a distance $(\frac{1}{2}) \times S$ from the solid-line position of FIG. 2. On the photodetector 33, therefore, interference fringes are produced which result from interference between the wavefront A and the wavefront B which corresponds to a wavefront that would be produced by shifting the wavefront A by S. In this sense, this interference process is a shearing interference process.

The corner-cube prism 280 can also be slightly displaced by the piezoelectric device 30 to modulate the phase of the wavefront A. In this sence, this interference process is a fringe scanning process.

Accordingly, this interference optical system constitutes a fringe scanning shearing interferometer.

For measuring the concave surface 250 for a surface configuration which would be the case if turned 90° from the illustrated measuring position, the step motor 29x is reversed to return the corner-cube prism 270 to the origin on the x-direction, and then the step motor 29y is energized to shear the corner-cube prism 270 in the manner similar to the aforesaid process to produce interference fringes on the photodetector 33.

While the object under test has been shown as a concave surface, an optical device may be measured for its wavefront aberration, its degree of eccentricity, or its focal length.

Although certain preferred embodiments have been shown and described, it should be understood that many changes and modifications may be made therein without departing from the scope of the appended claims.

What is claimed is:

1. A fringe scanning shearing interferometer comprising:
 (a) converter means for converting a wavefront reflected by an object under test, illuminated with light, into an approximately parallel wavefront;
 (b) splitter means for dividing said approximately parallel wavefront into first and second wavefronts travelling in two directions;
 (c) a pair of first and second optical path changing means which conduct the first and second wavefronts, respectively, and are disposed respectively adjacent to said splitter means in equally spaced relation thereto;
 (d) displacement means for displacing said first optical path changing means in a direction normal to the direction in which said first wavefront falls on said first optical path changing means;
 (e) shearing means for slightly displacing said second optical path changing means in the same direction as that in which second wavefront falls on said second optical path changing means;
 (f) a photodetector; and
 (g) a focusing lens for focusing said first and second wavefronts, which have passed respectively through said first and second optical path changing means and have been directed thereby so that they can be focused by said focusing lens, on said photodetector to produce interference fringes thereon.

2. A fringe scanning shearing interferometer according to claim 1, wherein said object under test has a surface which comprises one of a flat surface, a spherical surface, and an aspherical surface.

3. A fringe scanning shearing interferometer according to claim 1, wherein said object under test comprises an optical device measured for one of a wavefront aberration, a degree of eccentricity, and a focal length thereof.

4. A fringe scanning shearing interferometer according to claim 1, wherein said light falling on said object comprises coherent light.

5. A fringe scanning shearing interferometer according to claim 4, wherein said coherent light comprises a laser beam.

6. A fringe scanning shearing interferometer according to claim 1, wherein said converting means comprises a converter lens for converting a parallel light beam into a spherical wave lying on a reference spherical surface.

7. A fringe scanning shearing interferometer according to claim 6, wherein said reference spherical surface has a radius equal to a distance from the focal point of said converter lens to the vertex of a curved surface under test of said object on an optical axis thereof.

8. A fringe scanning shearing interferometer according to claim 1, wherein said splitter means comprises a beam splitter having a mirror surface inclined 45° with respect to the direction in which said approximately parallel wavefront travels.

9. A fringe scanning shearing interferometer according to claim 1, wherein each of first and second optical path changing means comprises a right-angled prism.

10. A fringe scanning shearing interferometer according to claim 9, wherein said right-angled prism has reflecting roof surfaces disposed to reflect back one of said first and second wavefronts which fall on the right-angled prism.

11. A fringe scanning shearing interferometer according to claim 9, wherein said displacement means comprises a step motor having a shaft, a screw shaft coupled coaxially to said shaft of the step motor, and a frame threaded over said screw shaft and connected to said right-angled prism of said first optical path changing means.

12. A fringe scanning shearing interferometer according to claim 9, wherein said displacement means comprises a piezoelectric device.

13. A fringe scanning shearing interferometer according to claim 9, wherein said shearing means comprises a piezoelectric device coupled to said right-angled prism of said second optical path changing means.

14. A fringe scanning shearing interferometer according to claim 1, wherein each of first and second optical path changing means comprises a conical corner-cube prism having three roof angles and disposed to reflect back one of said first and second wavefronts along an axis precisely parallel to the incident axis of the wavefront.

15. A fringe scanning shearing interferometer according to claim 14, wherein said displacement means comprises a pair of step motors having respective shafts, a pair of screw shafts coupled coaxially to said shafts of the step motors and extending at at a right angle with respect to each other, and a pair of frames threaded over said screw shafts and connected to said corner-cube prism of said first optical path changing means, whereby said first optical path changing means can be displaced in two orthogonal directions lying in a plane normal to the direction in which said first wavefront falls on said first optical path changing means.

16. A fringe scanning shearing interferometer according to claim 14, wherein said displacement means comprises a piezoelectric device coupled to said corner-cube prism of said first optical path changing means.

17. A fringe scanning shearing interferometer according to claim 14, wherein said shearing means comprises a step motor having a shaft, a screw shaft coupled coaxially to said shaft of the step motor, and a frame threaded over said screw shaft and connected to said corner-cube prism of said second optical path changing means.

18. A fringe scanning shearing interferometer according to claim 14, wherein said shearing means comprises a piezoelectric device coupled to said corner-cube prism of said second optical path changing means.

* * * * *